United States Patent [19]

Christie et al.

[11] Patent Number: 5,450,691
[45] Date of Patent: Sep. 19, 1995

[54] SUPPORT FOR PLANTS AND THE LIKE

[75] Inventors: Molly C. Christie; Kenneth R. Christie, both of Stratford, Canada

[73] Assignee: Vermil Marketing Inc., Stratford, Canada

[21] Appl. No.: 60,606

[22] Filed: May 11, 1993

[51] Int. Cl.⁶ ............................................. A01G 9/02
[52] U.S. Cl. ............................................. 47/83; 47/66
[58] Field of Search ................... 47/82, 83, 66, 66 C

[56] References Cited

U.S. PATENT DOCUMENTS

| | | | |
|---|---|---|---|
| D. 242,941 | 1/1977 | Nagata | 47/66 |
| 706,821 | 8/1902 | Hart | 47/83 |
| 966,262 | 8/1910 | Stigler | 47/66 |
| 2,222,815 | 11/1940 | Johnson | 47/66 |
| 3,165,863 | 1/1965 | Duran . | |
| 3,264,783 | 8/1966 | Bayliss . | |
| 3,605,336 | 9/1971 | Meisler . | |
| 3,958,365 | 5/1976 | Proctor | 47/66 |
| 4,313,278 | 2/1982 | Pointing et al. | 47/82 |
| 4,631,861 | 12/1986 | Wuthrich . | |
| 4,704,818 | 11/1987 | Cameron | 47/82 |
| 4,825,592 | 5/1989 | Earls | 47/82 |
| 4,858,380 | 8/1989 | Gayle . | |

FOREIGN PATENT DOCUMENTS

| | | | |
|---|---|---|---|
| 2556928 | 6/1985 | France | 47/66 |
| 3535343 | 4/1987 | Germany | 47/83 |

*Primary Examiner*—Michael Powell Buiz
*Assistant Examiner*—Joanne C. Downs
*Attorney, Agent, or Firm*—Darby & Darby

[57] ABSTRACT

A support for plants, flowers and the like to assist horticulturists create novel is provided and in one embodiment, includes framework surrounding an upstanding central tube. The framework consists of a plurality of vertically spaced, circular rings which decrease in diameter from bottom to top. Vertical supports span adjacent rings and are spaced about the circumference of the framework. A retaining ring surrounds the bottom of the tube adjacent its bottom and has two pair of diametrically extending arms with downturned ends to support the tube in an upright manner. A second retaining ring surrounds the tube adjacent the top of the framework. The downturned ends of this retaining ring snap over the top of the framework to hold the framework and tube in place. Matting lines the interior of the framework to define an within the framework to be filled with soil. Plants, flowers and the like can be planted in the soil through the matting. The framework can be placed in an existing flower pot or can stand alone. Accessories of various shapes such as a sphere can be attached to the top of the tube above the framework to increase the variety of arrangements that can be created. In a second embodiment, the upstanding central tube is removed and the framework is used only in conjunction with the matting. In yet another embodiment, the matting is replaced with moisture retaining material to allow cut flower arrangements to be created.

27 Claims, 5 Drawing Sheets

SUPPORT FOR PLANTS AND THE LIKE

FIELD OF THE INVENTION

The present invention relates to support for plants, flowers, and the like.

BACKGROUND OF THE INVENTION

Structures for use in gardens to support and/or guard plants are well known in the art. These structures have been designed for use in outdoor gardens and indoors with potted plants. For example, U.S. Pat. No. 3,165,863 to Duran discloses a plant stake which includes a band to sit within a flower pot. Radial arms extend inwardly from the band and terminate at a threaded collar. A plurality of concentric tubes are carried by the collar and are moveable to allow the vertical height of the stake to be adjusted. Catches allow the height of the stake to be set. The bottom of the tube terminates in a threaded portion which engages the collar and abuts the bottom of the flower pot. In use, the stake is placed in the flower pot and the flower pot is filled with soil.

U.S. Pat. No. 3,264,783 to Bayliss discloses a collapsible trellis for supporting plants. The trellis includes three vertically spaced, horizontal rings which increase in diameter upwardly from the lowermost ring. Vertical spacer arms maintain the horizontal rings in position. The lowermost spacer arms are received in apertures formed in a base plate to be received in a flower pot.

U.S. Pat. No. 3,605,336 to Meisler discloses a frame for growing hops and the like. The frame includes a plurality of vertically spaced hoops around which a plurality of vertical support arms are located. The frame is designed to assist plants to grow outwardly and downwardly after the plants have grown high enough to clear the uppermost hoop.

U.S. Pat. No. 4,631,861 to Wuthrich discloses a combination plant pot and trellis. The trellis includes a plurality of vertically spaced, horizontal hoops. A plurality of vertical support arms extend between the hoops to maintain their spacing. The support arms extend below the lowermost hoop and terminate in tabs. The tabs are received in apertures formed in the flower pot.

U.S. Pat. No. 4,858,380 to Gayle discloses a guard structure for tomato plants or the like. The structure includes a first enclosure shaped from wire mesh and having legs to anchor the structure in the ground. A second enclosure having a diameter larger than the first enclosure is located above the first enclosure. The second enclosure is also constructed of wire mesh and has a lid hingedly attached to it. The structure is designed to protect fruit from animals while permitting access to ripened fruit.

Although these devices support and/or guard plants, improved supports for plants and the like are continually being sought. It is therefore an object of the present invention to provide a novel support for plants, flowers and the like.

SUMMARY OF THE INVENTION

According to one aspect of the present invention there is provided a support for plants and the like comprising:

an upstanding frame having a plurality of spaced frame elements defining a lattice; and a matting lining the interior of said frame and adapted to allow the roots of plants and the like to pass, said matting defining a soil receptacle within said frame whereby the receptacle can be filled with soil allowing plants to be planted vertically along said upstanding frame with their roots passing through said matting and taking hold in said soil.

According to another aspect of the present invention there is provided a planter comprising:

an upstanding frame having a plurality of spaced frame elements defining a lattice;

a matting lining the interior of said frame and adapted to allow the roots of plants and the like to pass, said matting defining a soil receptacle within said frame; and soil filling said receptacle whereby plants can be planted vertically along said upstanding frame with their roots passing through said matting and taking hold in said soil.

Preferably, the support further includes at least one second frame removably attachable to the upstanding frame and matting lining the interior of the at least one second frame and defining at least one second receptacle therein. The at least one second receptacle can also be filled with soil allowing plants to be planted along the at least one second frame with their roots passing through the matting and taking hold in the soil. It is also preferred that the upstanding frame includes a central tubular member surrounded by a framework constituted by the frame elements and retaining means acting between the framework and the tubular member. In one embodiment, the retaining means includes at least one retainer surrounding the tube and including a plurality of outwardly extending arms engaging the framework. In another embodiment, the retaining means is in the form of welds between the framework and the tubular member.

Preferably, the tubular member extends vertically above the framework and the at least one second frame is removably attachable to the tubular member.

According to yet another aspect of the present invention there is provided in combination, a flower pot to be filled with soil and a support for plants and the like supported by said flower pot, said support comprising:

an upstanding frame having a plurality of spaced frame elements defining a lattice; and a matting lining the interior of said frame and adapted to allow the roots of plants and the like to pass, said matting defining a soil receptacle within said frame whereby the flower pot and receptacle can be filled with soil allowing plants to be planted vertically along said upstanding frame with their roots passing through said matting and taking hold in said soil.

Preferably, the flower pot has a shoulder therein spaced from the bottom thereof and the support rests on the shoulder.

In still yet another aspect of the present invention there is provided a support for cut flower arrangements and the like comprising:

an upstanding frame having a plurality of spaced frame elements defining a lattice; and a lining formed of moisture retaining material along the interior of said frame adapted to receive the stems of cut flowers and the like.

The present invention provides advantages in that a variety of plant and/or flower arrangements can be made without or in conjunction with a flower pot which heretofore were not possible.

BRIEF DESCRIPTION OF THE DRAWINGS

Embodiments of the present invention will now be described more fully with reference to the accompanying drawings in which:

FIG. 1 is a perspective view of a frame forming part of a support for plants, flowers and the like;

FIG. 6 is a side elevation view of yet another alternative embodiment of a support for plants, flowers and the like.

DETAILED DESCRIPTION OF THE PREFERRED EMBODIMENTS

Figure 1:
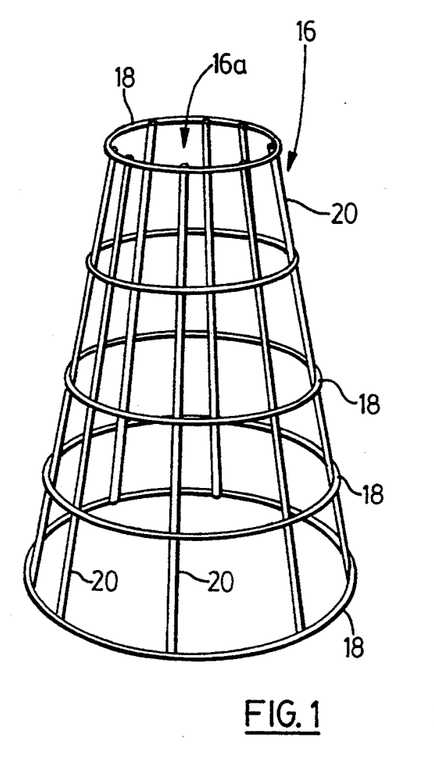
Figures 2, 2A:
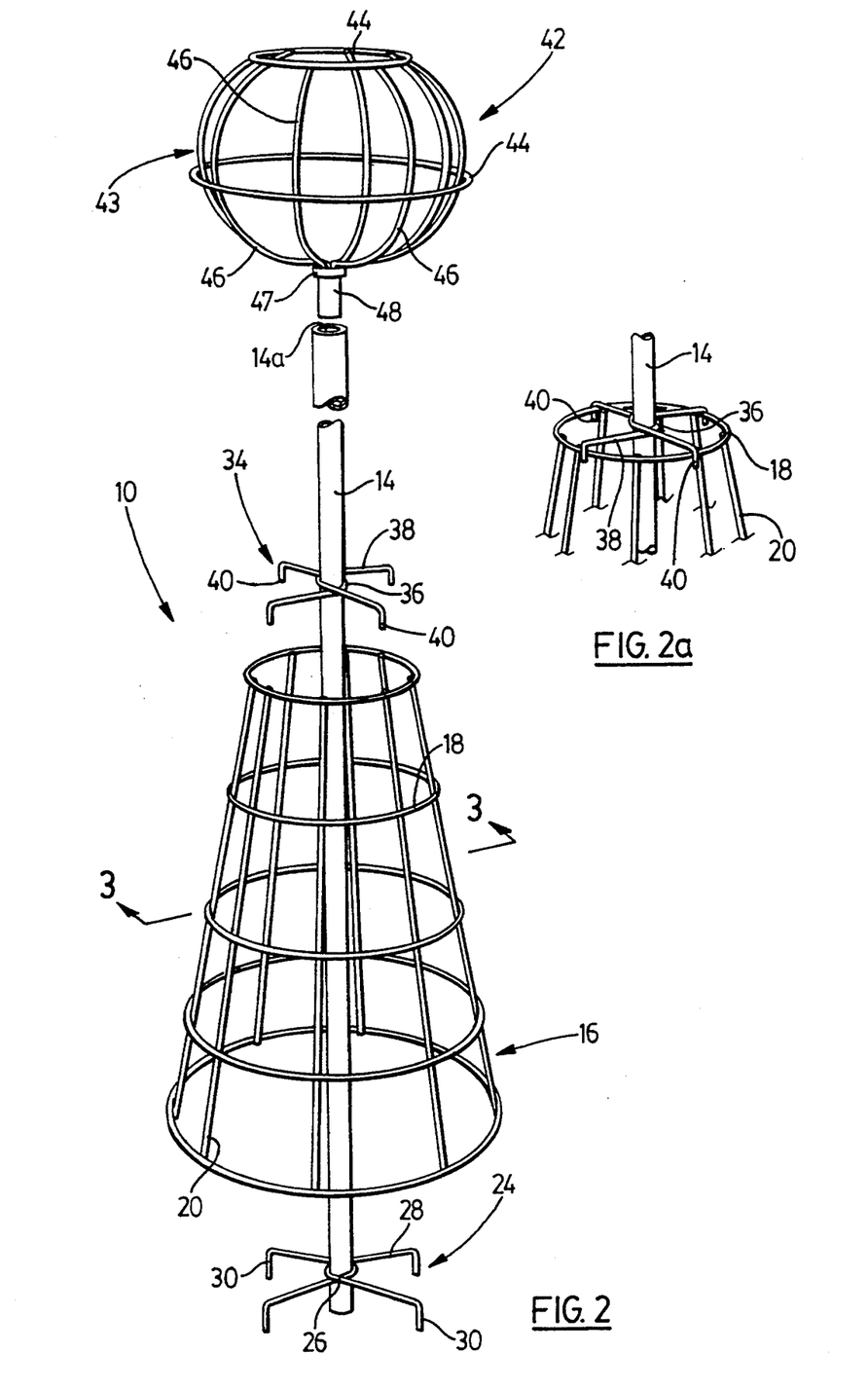
FIG. 2 is an exploded perspective view of a first embodiment of a support for plants, flowers and the like incorporating the frame illustrated in FIG. 1.
FIG. 2a is a perspective view of a portion of the support of FIG. 2.

Referring now to FIGS. 1, 2 and 2a, a support for plants and/or flowers and the like is shown and is generally indicated by reference numeral 10. The support 10 is designed to allow a variety of plant and/or flower arrangements to be created and will now be described more fully. It should be apparent to those of skill in the art that "plants" within the context of the present specification refers to any desired form of vegetation to be grown on the support 10.

As can be seen, the support 10 includes a central upstanding, hollow tube 14 surrounded by generally conical, framework 16. The framework 16, which is best seen in FIG. 1, includes a plurality of vertically spaced, horizontal metal rings 18 which decrease in diameter from bottom to top giving the framework its conical appearance. Vertical metal supports 20 are circumferentially spaced about the framework 16 and bridge the rings 18. The rings 18 and supports 20 are held together by welds at their points of intersection. The spaces between the rings 18 and the supports 20 are designed to accommodate plants as will be described.

A retainer 24 surrounds the tube 14 adjacent its bottom end to stabilize the tube 14. The retainer 24 includes a central ring 26 through which the tube 14 passes and a plurality of arms 28 radially, outwardly extending from the central ring 26. The arms 28 are circumferentially spaced about the central ring 26 at approximately 900 intervals and have downturned ends 30. A second virtually identical retainer 34 surrounds the tube 14 adjacent the uppermost ring 18 of the framework 16. The retainer 34 includes a central ring 36 through which the tube 14 passes. A plurality of arms 38 radially, outwardly extend from the central ring 36 at approximately 90° intervals and have downturned ends 40. The arms 38 pass over the uppermost ring 18 while their downturned ends 40 snap over it to hold the framework 16 and tube 14 in position (see FIG. 2a).

An accessory 42 also designed to support plants, flowers and the like is received in the open top 14a of the tube 14 and is supported above the framework 16. In this embodiment, the accessory 42 includes a second framework 43 having a generally spherical shape which is constituted by a pair of latitudinal metal rings 44 bridged by longitudinal metal supports 46. The rings 44 and supports 46 are welded together at their points of intersection. The supports 46 are also welded to a circular disc 47 at the bottom of the accessory 42. Depending from the disc 47 is a cylindrical post 48 which is received in the open top 14a of the tube 14.

Figure 3:
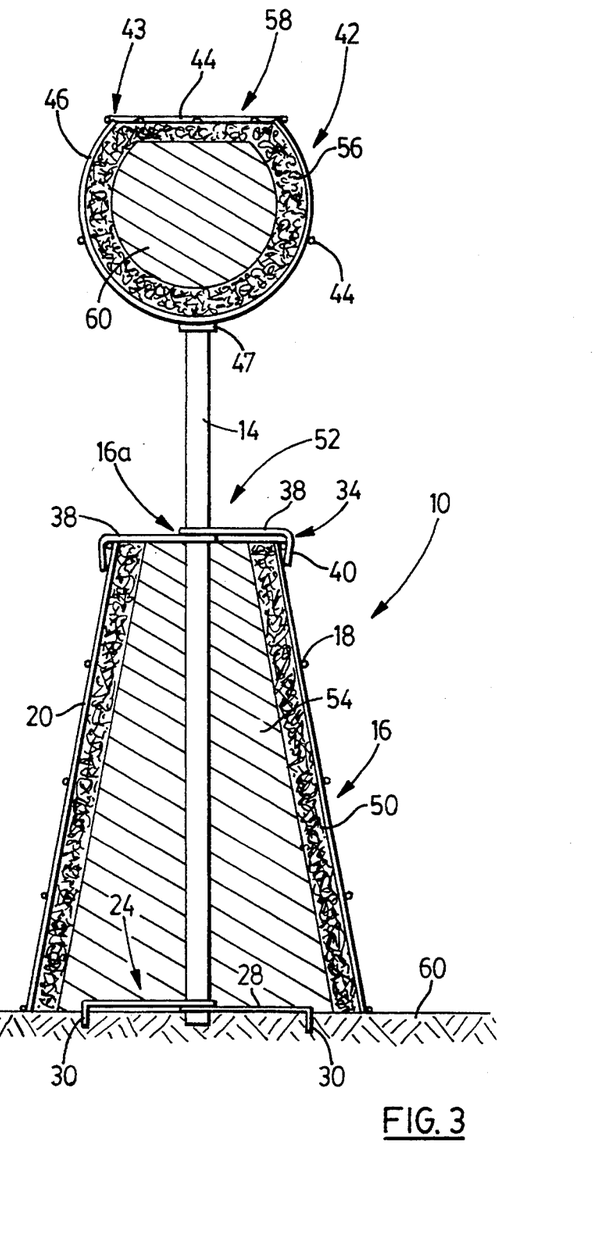
FIG. 3 is a sectional view of the support of FIG. 2 resting on a soil bed.
Figure 4:
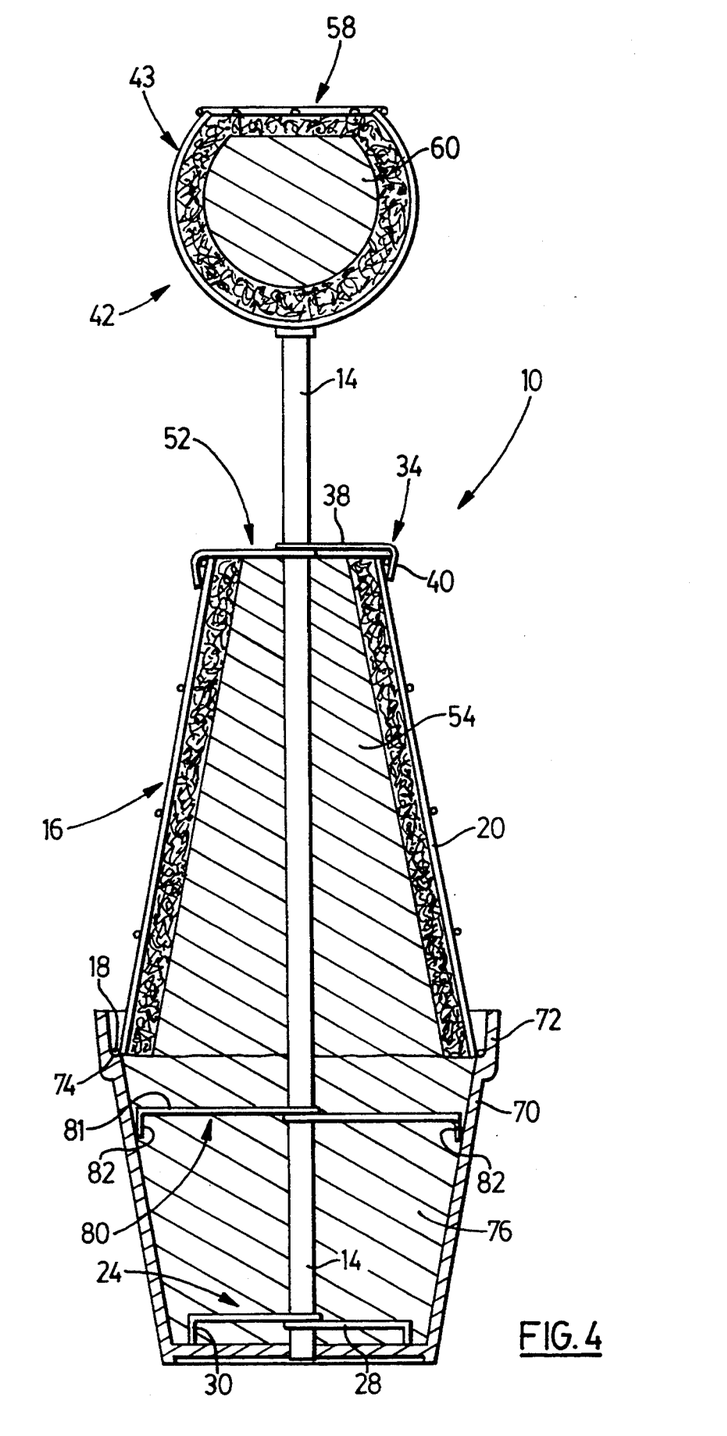
FIG. 4 is a sectional view of the support of FIG. 2 received in a flower pot.

Matting 50 lines the interior of the framework 16 to create a soil receptacle 52 within the framework for soil 54 (see FIGS. 3 and 4). The matting 50 is designed to allow the roots of plants, flowers and the like to pass therethrough and take hold in the soil 54 held by the receptacle 52. Similar matting 56 lines the interior of the framework 43 to create a soil receptacle 58 within the framework 43 for soil 60 that is isolated from receptacle 52 within framework 16. The matting 56 is in two pieces, namely a circular piece at the bottom of the framework 43 and a strip that wraps around the framework 43 above the circular piece.

In use, the support 10 can be placed outdoors with a flower pot as well as on a desired flat, hard-surfaced area such as for example a soil bed, walkway, deck, patio etc. or placed indoors in a flower pot. FIG. 3 shows the support 10 placed outdoors on a soil bed 60. When placing the support 10 on the soil bed 60, the tube 14 is positioned at the desired location and pushed slightly into the soil bed. The retainer 24 is also brought into contact with the soil bed and is pushed into the soil bed 60 so that the downturned ends 30 extend into the soil. The framework 16 with the matting 50 lining its interior is then positioned so that its lowermost ring 18 rests on the soil bed 60.

The receptacle 52 is then filled to the top with the soil 54 through the open top 16a of the framework 16. After this, the second retainer 34 is placed over the tube 14 and is arranged so that its arms 38 overlie the uppermost ring 18 of the framework 16 with the ends 40 of the arms snapping over the uppermost ring 18. Once this is done, plants can be planted vertically along the framework 16 with their roots passing through the spaces in the framework 16 and through the matting 50 allowing the plants to take hold and grow.

If desired, the accessory 42 can be placed on the open top 14a of the tube 14 and the receptacle 58 therein filled with soil 60 allowing plants to be planted along the framework 43 with their roots passing through the spaces in the framework 43 and through the matting 56 and taking hold in the soil.

FIG. 4 shows the support 10 in a flower pot 70. The flower pot 70 is conventional and has a collar 72 at its open upper end defining a shoulder 74 within the flower pot. When using the support 10 with the flower pot 70, the tube 14 is positioned centrally in the flower pot. The retainer 24 is positioned at the bottom of the tube 14 so that the downturned ends 30 thereof contact the bottom of the flower pot 70. The flower pot is then partially filled with soil 76. A third larger retainer 80 is then positioned on the tube 14 below the shoulder of the flower pot 70 with its arms 81 resting against the side of the flower pot and its downturned ends 82 pushed into the soil. The framework 16 is then placed within the flower pot 70 so that the lowermost ring 18 rests on the shoulder 74. The receptacle 52 is then filled to the top with soil 54 and the retainer 34 is placed over the tube 14 with its downturned ends 40 snapping over the uppermost ring 18 of the framework 16. Once this is done, plants can be planted along the framework 16 with their roots passing through the spaces in the framework 16 and through the matting 50 and taking hold in the soil.

Similarly, an accessory 42 can be placed on the top of the tube 14 and filled with soil 60 to allow plants, flowers and the like to be planted along the framework 43. The extra retainer helps to stabilize the tube 14.

Figure 5:
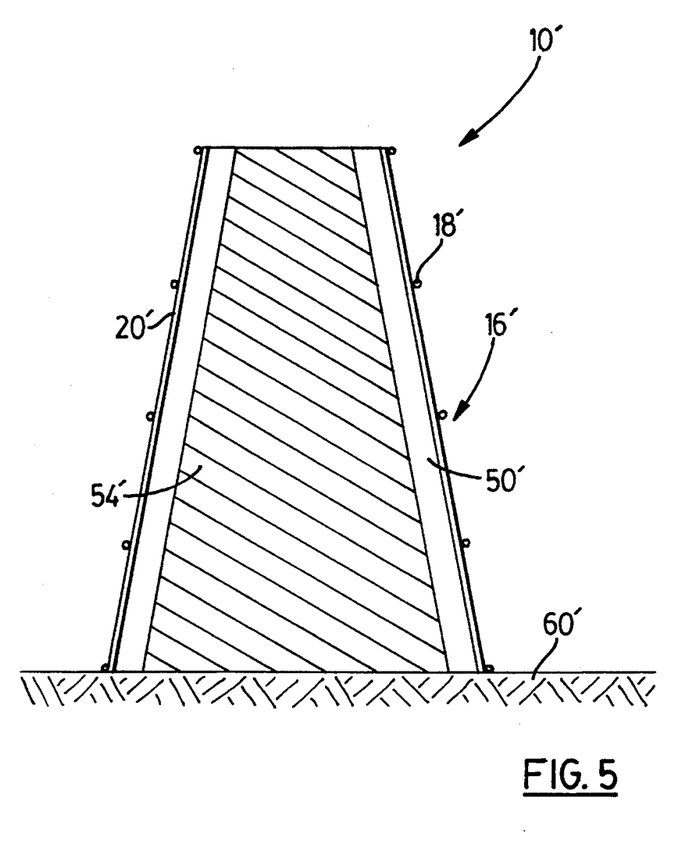
FIG. 5 is a sectional view of an alternative embodiment of a support for plants, flowers and the like incorporating the frame illustrated in FIG. 1.

Referring now to FIG. 5, an alternative embodiment of a support for plants, flowers and the like is shown. In this embodiment, like reference numerals will be used to indicate like components with a "'" added for clarity. The support 10' is basically the same as that shown in FIGS. 1 to 4 except that the central upstanding tube 14 and accessory 42 have been removed. Therefore, the framework 12' is used only in conjunction with the matting 50' and is filled with soil 54'. In this embodiment, although the support 10' is shown supported on a soil bed 60', it should be realized that the support 10' may be used outdoors with a flower pot or on any other suitable hard-surfaced area or indoors supported in a flower pot similar to that shown in FIG. 4.

Figure 6:
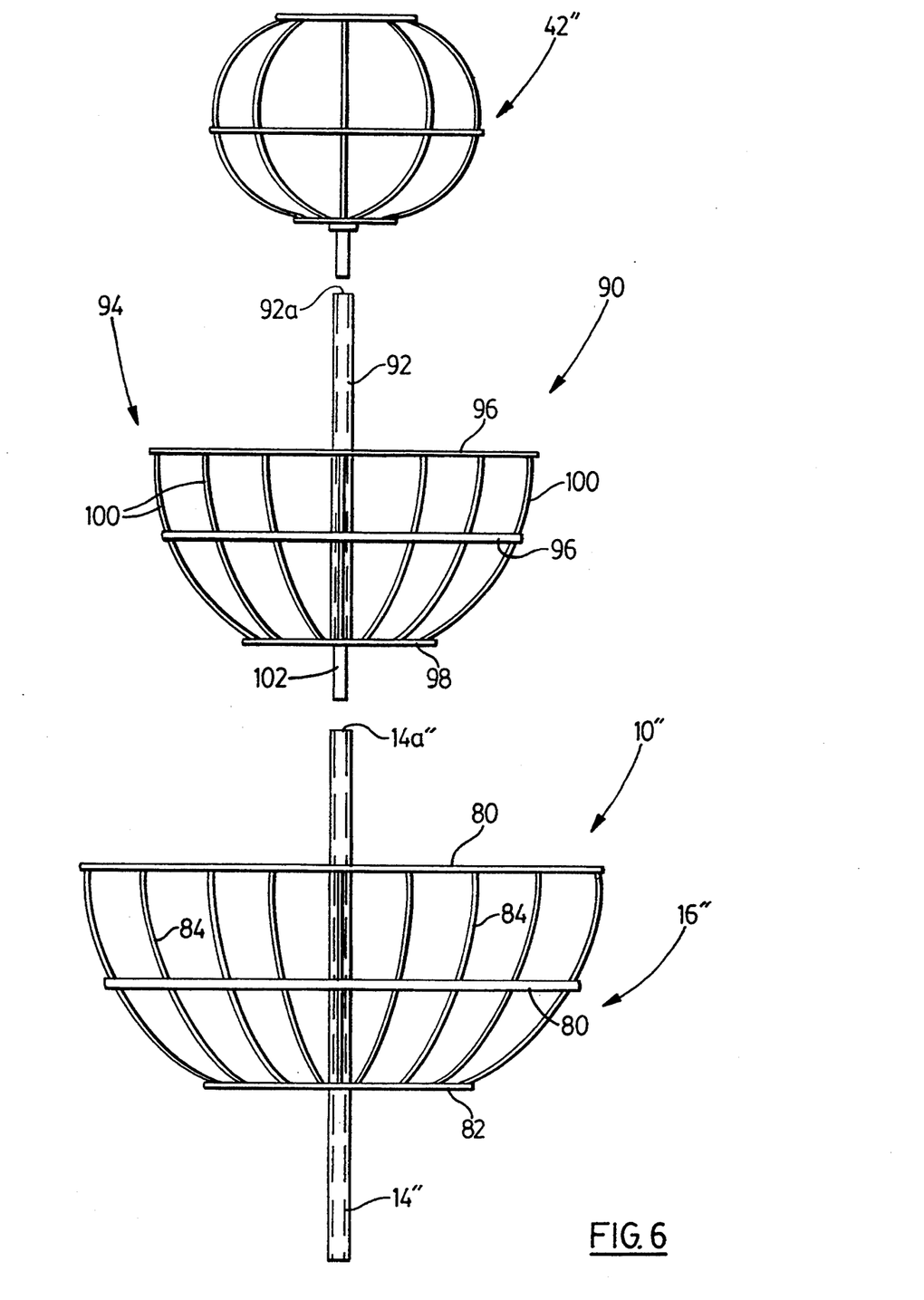

Referring now to FIG. 6, yet another embodiment of a support for plants, flowers and the like is shown. In this embodiment, like reference numerals will be used to indicate like components with a "''" added for clarity. As can be seen, the support 10" includes a central upstanding tube 14" on which is secured a framework 16". The framework 16" is fastened to the tube 14" intermediate its length and is bowl shaped. The framework 16" includes a pair of vertically spaced, circular rings 80 above a solid circular base 82. Supports 84 are circumferentially spaced about the framework 16" and are welded to the rings 80 and the base 82 at their points of intersection.

Above the support 10" is an accessory 90 which is basically the same as the support 10" but only smaller in dimension. Therefore, the accessory 90 includes a central upstanding tube 92 on which is secured a framework 94. The framework 94 is fastened to one end of the tube 92 and is bowl shaped. The framework includes a pair of vertically spaced, circular rings 96 above a solid circular base 98. Supports 100 are circumferentially spaced about the framework 94 and are welded to the rings 96 and the base 98 at their points of intersection. A cylindrical post 102 depends from the base 98 and is received in the open top 14a" of the tube 14". Above the tube is yet another accessory 42" virtually identical to that shown in FIGS. 2, 3 and 4. The accessory 42" is received in the open top 92a of the tube 92.

In use, the portion of tube 14" below the framework 16" is buried in a soil bed 60" with the base 82 of the framework either resting on or being spaced slightly from the upper surface of the soil bed 60". The framework 16" is lined with matting (not shown) and filled with soil allowing, plants to be arranged on the support. When one or both of the accessories 90, 42" are placed on the support 10", they too are lined with matting to allow interesting arrangements to be created when plants and the like are planted therein.

Although the present support has been described as having a generally conical or bowl-shaped framework in configuration, it should be realized that other framework configurations may be used provided that a suitable receptacle for soil is provided when the framework is lined with the matting.

In addition, although the framework has been described as being constituted by metal frame elements welded together, other suitable material may be used to form the framework. If synthetic material is used, the framework may be formed in one piece in a moulding process. Holes may then be cut out of it to form the spaces to accommodate the plants. The framework may of course be moulded in a manner to provide the spaces.

Also, if it is desired to use the support 10 to create cut flower arrangements, the matting and soil can be replaced with a moisture retaining foam or other suitable material. In this embodiment, the cut flowers can be pushed into the moisture retaining material through the spaces.

We claim:

1. A support for plants and the like comprising:
   a first frame having a plurality of first spaced frame elements defining spaces through which roots of plants and the like may pass;
   a first matting lining the interior of said first frame and adapted to allow roots of plants and the like to pass, said first matting defining a first soil receptacle within said first frame;
   at least one second frame vertically spaced from said first frame and having a plurality of second spaced frame elements defining spaces through which roots of plants and the like may pass;
   second matting lining the interior of said at least one second frame and defining a second soil receptacle within said at least one second frame, said second soil receptacle being isolated from said first soil receptacle, wherein said first and second soil receptacles can be independently filled with soil allowing plants and the like to be planted along one or both of said first and at least one second frames with their roots passing through said spaces and matting and taking hold in said soil; and
   support means to space said at least one second frame above said first frame.

2. A support as defined in claim 1 wherein said first frame includes a central tubular member surrounded at least partially by a framework constituted by said first frame elements and retaining means acting between said framework and said tubular member.

3. A support as defined in claim 2 wherein said tubular member extends vertically above said framework to constitute said support means, said at least one second frame being removably attachable to said tubular member.

4. A support as defined in claim 3 wherein said framework is generally conical in configuration and decreases in diameter from bottom to top.

5. A support as defined in claim 4 wherein said retaining means includes at least one retainer surrounding said tubular member and including a plurality of outwardly extending arms, said arms engaging with said framework.

6. A support as defined in claim 3 wherein said at least one second frame is generally spherical in configuration.

7. A support as defined in claim 2 wherein said retaining means is in the form of a weld between said framework and said tubular member.

8. A support as defined in claim 7 wherein said framework is generally bowl-shaped and has a circular base through which said tubular member passes, said base being welded to said tubular member to constitute said retaining means.

9. A support as defined in claim 1 including two or more second frames vertically spaced from one another, said support means spacing said two or more second frames above said first frame.

10. A support as defined in claim 9 including two second frames, one of said two second frames being generally bowl-shaped and the other of said two second frames being generally spherical-shaped.

11. In combination, a flower pot to be filled with soil and a support for plants and the like supported by said flower pot, said support comprising:
   a first frame having a plurality of first spaced frame elements defining spaces through which roots of plants and the like may pass;
   a first matting lining the interior of said first frame and adapted to allow roots of plants and the like to pass, said first matting defining a first soil receptacle within said first frame;
   at least one second frame vertically spaced from said first frame and having a plurality of second spaced frame elements defining spaces through which roots of plants and the like may pass;
   second matting lining the interior of said at least one second frame and defining a second soil receptacle within said at least one second frame, said second soil receptacle being isolated from said first soil receptacle, wherein said flower pot and said first and second soil receptacles can be filled with soil allowing plants and the like to be planted along said first and at least one second frames with their roots passing through said spaces and matting and taking hold in said soil; and
   support means to space said at least one second frame above said first frame.

12. The combination of claim 11 wherein said flower pot has a shoulder therein spaced from the bottom thereof and wherein said support rests on said shoulder.

13. The combination of claim 12 wherein said at least one second frame is removably attached to said support means.

14. A planter comprising:
   a first frame having a plurality of first spaced frame elements defining spaces through which roots of plants and the like may pass;
   a first matting lining the interior of said first frame and adapted to allow roots of plants and the like to pass, said first mating defining a first soil receptacle within said first frame;
   at least one second frame vertically spaced from said first frame and having a plurality of second spaced frame elements defining spaces through which roots of plants and the like may pass; and
   second matting lining the interior of said at least one second frame and defining a second soil receptacle within said at least one second frame, said second soil receptacle being isolated from said first soil receptacle;
   support means to spaced said at least one second frame above said first frame; and
   soil filling one or both of said first and second soil receptacles wherein plants can be planted vertically independently along said first and second frames with their roots passing through respective first and second matting and taking hold in said soil.

15. A planter as defined in claim 14 wherein said first frame is supported on a soil bed.

16. A planter as defined in claim 14 wherein said first frame is supported by a flower pot.

17. A planter as defined in claim 14 wherein said at least one second frame is removably attached to said support means.

18. A planter as defined in claim 17 wherein said first frame includes a central tubular member surrounded at least partially by a framework constituted by said first frame elements and retaining means acting between said framework and said tubular member.

19. A planter as defined in claim 19 wherein said tubular member extends vertically above said framework to constitute said support means, said at least one second frame being removably attached to said tubular member.

20. A planter as defined in claim 19 wherein said framework is generally conical in configuration and decreases in diameter from bottom to top.

21. A planter as defined in claim 20 wherein said retaining means includes at least one retainer surrounding said tubular member and including a plurality of outwardly extending arms, said arms engaging with said framework.

22. A planter as defined in claim 21 wherein said at least one second frame is generally spherical in configuration.

23. A planter as defined in claim 18 wherein said retaining means is in the form of a weld between said framework and said tubular member.

24. A planter as defined in claim 17 including two or more second frames vertically spaced from one another, said support means spacing said two or more second frames above said first frame.

25. A support for plants and the like comprising:
   a first generally upright frame having a plurality of first spaced frame elements defining spaces through which roots of plants and the like may pass, said first frame including a central tubular member surrounded at least partially by a framework constituted by said first frame elements and retaining means acting between said framework and said tubular member, said retaining means including at least one retainer surrounding said tubular member and having a plurality of outwardly extending arms, said arms engaging with said framework;
   a first matting lining the interior of said first frame and adapted to allow roots of plants and the like to pass, said first matting and first frame defining a first soil receptacle within said first frame;
   at least one second frame attached to said first frame, said second frame having a plurality of second spaced frame elements defining spaces through which roots of plants and the like may pass; and
   a second matting lining the interior of said second frame and adapted to allow roots of plants and the like to pass, said second matting and said at least one second frame defining a second soil receptacle within said second frame wherein said first and second soil receptacles can be filled with soil allowing plants to be planted along said first and second frames with their roots passing through said respective matting and taking hold in said soil.

26. A support for plants and the like comprising:
   a first generally upright frame having a plurality of first spaced frame elements defining spaces through which roots of plants and the like may pass, said first frame including a central tubular member surrounded at least partially by a framework constituted by said frame elements; and retaining means acting between said framework and said tubular member, said retaining means being in the form of a weld between said framework and said tubular member, said framework being generally bowl-shaped and having a circular base through which a tubular member passes, said base being welded to said tubular member to constitute said retaining means;

a first matting lining the interior of said first frame and adapted to allow roots of plants and the like to pass, said first matting and first frame defining a first soil receptacle within said first frame;

at least one second frame attached to said first frame, said second frame having a plurality of second spaced frame elements defining spaces therebetween through which roots of plants and the like may pass; and a second matting lining the interior of said second frame and adapted to allow roots of plants and the like to pass, said second matting and said at least one second frame defining a second soil receptacle within said second frame wherein said first and second soil receptacles can be filled with soil allowing plants to be planted along said first and second frames with their roots passing through said respective matting and taking hold in said soil.

27. A planter comprising:

a first generally upright frame having a plurality of first spaced frame elements defining spaces through which roots and the like may pass, said first frame including a central tubular member surrounded at least partially by a framework constituted by said first frame elements and retaining means acting between said framework and said tubular member, said retaining means including at least one retainer surrounding said tubular member and having a plurality of outwardly extending arms, said arms engaging with said framework;

a first matting lining the interior of said first frame and adapted to allow roots of plants and the like to pass, said first matting and first frame defining a first soil receptacle within said first frame;

at least one second frame attached to said first frame, said second frame having a plurality of second spaced frame elements defining spaces therebetween through which roots of plants and the like may pass;

a second matting lining the interior of said second frame and adapted to allow roots and plants and the like to pass, said second matting and said at least one second frame defining a second soil receptacle within said second frame; and soil filling at least one of said first and second soil receptacles to allow plants to be planted along said first and second frames with their roots passing through said respective matting and taking hold in said soil.

* * * * *